June 16, 1925.
O. P. CANADAY
HOSE COUPLING
Filed March 19, 1923
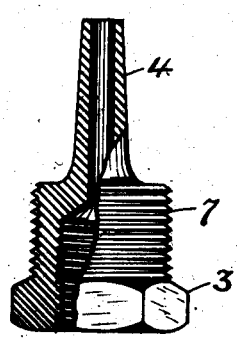
Orpha P. Canaday, INVENTOR
BY
A. G. Burns ATTORNEY Patented June 16, 1925.

1,542,371

UNITED STATES PATENT OFFICE.

ORPHA P. CANADAY, OF FORT WAYNE, INDIANA.

HOSE COUPLING.

Application filed March 19, 1923. Serial No. 626,033.

*To all whom it may concern:*

Be it known that I, ORPHA P. CANADAY, a citizen of the United States of America, and resident of Fort Wayne, in the county of Allen and State of Indiana, have invented certain new and useful Improvements in Hose Couplings, of which the following is a specification.

This invention relates to improvements in hose couplings of that class in which are employed means for connecting a rubber hose to a metal pipe. It has been found that the external diameters of standard sizes of air hose such as are supplied for use in inflating automobile tires, and for similar purposes, are only approximately uniform, and that more or less difficulty is thus caused in the fitting of the hose in the ordinary coupling. It is an object of the present invention to afford a coupling so constructed as to be applicable to rubber hose regardless of the usual variations in the external diameter that occurs in the various sizes. Another object of the improvement is to provide a simple means of connecting a rubber hose tightly upon a metallic nipple, and which can be easily and quickly applied, as well as removed and replaced.

These objects are accomplished by the construction illustrated in the accompanying drawings, in which;—

Fig. 1 is an elevation of a construction embodying the invention, a portion thereof being in central section; and Fig. 2 is an elevation of the metal nipple used in the construction, a portion being shown broken away.

The characters appearing in the description refer to parts shown in the drawings and designated thereon by corresponding characters.

The invention comprises the several parts for connecting a rubber hose 1 to a metal pipe 2, the parts consisting of a nipple 3 that is screwed onto the end of the pipe and with its stem 4 extending into the end of the hose 1; a metal wire coil 5 encompassing the hose; and a sleeve member 6 that has threaded engagement on the stock 7 of the nipple and has wedging engagement with the coil.

The stem 4 of the nipple tapers from its upper end, which is of a size that will admit of its insertion into the end of the hose, and is of gradually increasing diameter toward the stock, the increase being more pronounced at the juncture of the stem and stock. The sleeve 6 is internally threaded at its lower end to receive the stock 7 of the nipple, and its bore adjacent the threaded portion is tapered so as to present an annular internal slanting face 8, and the bore of the upper extremity of the sleeve is such as to approximately fit the hose.

The coil 5 of wire constitutes a contracting member and is formed with its coils close together and fitting snugly upon the hose before the hose is connected. Also, the coils extend spirally in the opposite direction to the threads on the stock and in the sleeve. That is, the threads on the stock may lead to the right, while the coils lead to the left.

In utilizing the invention the sleeve is slid onto the hose, after which the coil is likewise placed upon the hose, and the end of the hose is then slid onto the stem 4 of the nipple. The sleeve is then screwed onto the stock of the nipple during which operation the slanting face 8 of the sleeve engages the upper end of the coil, compressing it about the hose. As the sleeve is turned and moved downwardly onto the stock the coils of the wire, especially the uppermost coils, become constricted about the hose and clamp it tightly upon the stem. Also, as the sleeve moves downwardly the hose is drawn further onto the tapered stem, causing the end of the hose to become expanded in the coils of the wire, especially the lower coils thereof, so that the hose is tightly clamped upon the stem. Owing to the space 9 within the sleeve, between the lowermost coil and the stock, the coil is unobstructed at its lower end and consequently creeps until the coils are held firmly between the tapering face 8 and the hose and becomes increasingly constricted as the sleeve is screwed further onto the stock, which has the effect of a further tightening of the hose about the stem.

What I claim is:—

1. An air hose coupling comprising a nipple having an externally threaded stock and a tapering stem; a hose into the end of which the stem extends; a close coiled wire contracting member encompassing the hose about the stem, the coils of said member leading oppositely to the threads on said stock; and a sleeve member through which the hose projects having threaded relation with said stock and having also an internal annular tapering face that has constricting engagement with the coils of said member, there being space within the sleeve between the stock and the lower coil of said member to admit of the unobstructed creeping movement of said coils around the hose.

2. In a hose coupling, an externally threaded stock having a tapered stem for the reception of the hose; a close coil contracting member encompassing the hose about the stem; and a sleeve having threaded relation with the stock and constricting engagement with said member, there being space between said member and said stock admitting of unobstructed creeping movement of the lowermost coil of said member therein around the hose.

In testimony whereof I affix my signature in presence of two witnesses.

ORPHA P. CANADAY.

Witnesses:
MATILDA METTLER,
WALTER G. BURNS.